(12) United States Patent
Suryanarayana et al.

(10) Patent No.: US 6,762,623 B2
(45) Date of Patent: Jul. 13, 2004

(54) HIGH-RESOLUTION SINGLE-ENDED SOURCE-SYNCHRONOUS RECEIVER

(75) Inventors: Samudyatha Suryanarayana, Sunnyvale, CA (US); Aninda K. Roy, San Jose, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 10/320,148

(22) Filed: Dec. 16, 2002

(65) Prior Publication Data

US 2004/0113659 A1 Jun. 17, 2004

(51) Int. Cl.[7] .......................................... H03K 19/082
(52) U.S. Cl. ...................... 326/105; 326/98; 326/113; 327/68; 327/292
(58) Field of Search .............................. 326/93, 95, 98, 326/105, 113; 327/66, 77, 560–563; 330/253

(56) References Cited

U.S. PATENT DOCUMENTS 6,286,072 B1 * 9/2001 Bredin et al. ............... 710/305
6,333,660 B2 * 12/2001 Taguchi et al. ............. 327/292
6,535,032 B2 * 3/2003 Harrison ...................... 327/66

* cited by examiner

*Primary Examiner*—Vibol Tan
(74) *Attorney, Agent, or Firm*—Blakely Sokoloff Taylor & Zafman LLP

(57) ABSTRACT

Disclosed are novel methods and apparatus for efficiently providing high-resolution single-ended source synchronous receivers. In an embodiment of the present invention, a source-synchronous receiver is disclosed. The receiver includes: a first amplifier to receive a clock signal and a data signal, the first amplifier providing a first output signal; a second amplifier to receive a complementary clock signal and the data signal, the second amplifier providing a second output signal; a third amplifier to receive the clock signal and the data signal, the third amplifier providing a third output signal, the second and third output signals being combined to provide a fifth output; and a fourth amplifier to receive the complementary clock signal and the data signal, the fourth amplifier providing a fourth output signal, the first and fourth output signals being combined to provide a sixth output signal.

20 Claims, 4 Drawing Sheets

HIGH-RESOLUTION SINGLE-ENDED SOURCE-SYNCHRONOUS RECEIVER

FIELD OF INVENTION

The present invention generally relates to the field of communication. More specifically, an embodiment of the present invention provides a high-resolution single-ended source-synchronous receiver.

BACKGROUND OF INVENTION

Chip-to-chip wireline communication consists of a chip sending and receiving data from another chip over wires incorporated on a board on which the communicating chips are placed. The sending chip drives the data onto the wire, otherwise known as a board trace, using a driver circuit. The receiving chip receives the data at the other end of the communication bus using a receiver circuit. The unit of data transferred may be called a bit. A chip may use a single wire to send data, wherein the communication method is called single-ended signaling, or it may use a pair of wires to send data, wherein the communication method is called differential signaling.

In Single-ended signaling, a bit is driven onto a board trace at a particular voltage level. In binary communication, where data is coded as a series of 1's and 0's, a 1 could be any voltage above a particular value, while a 0 could be any voltage below a certain value. The driver, therefore, when driving a 1, places a voltage step on the board trace. The performance of the complete communication system is a factor of the edge-rate and the voltage level that the driver drives onto the board trace. Generally, a faster edge-rate and a higher voltage level result in a higher performance system. In single-ended signaling, the receiving chip compares the voltage of the bit sent down the board trace against an internally generated reference voltage to resolve the identity of the bit. For example, in binary communication, the receiver resolves a bit to be a 1 if the voltage it receives is above the reference voltage, and a 0 if the voltage is below the reference voltage. A voltage step may be referred to as being composed of a set of sine waves having different frequencies. The edge rate of the voltage step can be a function of the set of frequencies, e.g., with higher frequencies resulting in a faster edge-rate.

High-speed single-ended signaling over relatively long board traces suffers from a number of important problems. The voltage step launched by the driver suffers ISI (Intersymbol interference), skin effect, and dielectric losses on the board, especially at higher frequencies. Board losses in long traces do not only introduce attenuation of the signals, but, far more significantly, cause distortion. Distortion will in turn introduce ISI, which seriously limits the data rate. This results in a reduced data window both in voltage and time at the receiver, which makes it difficult to sample data at the receiver end.

These problems result in less separation between the data voltage and the reference voltage signals and, hence, a reduced noise margin. The noise performance of a system is generally determined based on how accurately a reference voltage is produced. As a result, an inaccurate voltage reference diminishes the performance of the signaling interface.

SUMMARY OF INVENTION

The present invention includes novel methods and apparatus to efficiently provide high-resolution single-ended source-synchronous receivers. In an embodiment of the present invention, a method of receiving a data signal in a source-synchronous receiver is disclosed. The method includes: providing a receiver to receive the data signal, the receiver receiving the data signal, a clock signal, and a complementary clock signal; differentially amplifying the data, clock, and complementary clock signals to provide a first output signal and a second output signal; and determining which one of the first and second output signals is provided through a combination of a high impedance signal and a logic signal.

In another embodiment of the present invention, the method includes selecting one of the first and second output signals as a receiver output signal based on the determining act.

In a further embodiment of the present invention, a source-synchronous receiver to receive a data signal is disclosed. The receiver includes: a first amplifier to receive a clock signal and the data signal, the first amplifier providing a first output signal; a second amplifier to receive a complementary clock signal and the data signal, the second amplifier providing a second output signal; a third amplifier to receive the clock signal and the data signal, the third amplifier providing a third output signal, the second and third output signals being combined to provide a fifth output; and a fourth amplifier to receive the complementary clock signal and the data signal, the fourth amplifier providing a fourth output signal, the first and fourth output signals being combined to provide a sixth output signal.

In yet another embodiment of the present invention, the receiver selects one of the fifth and sixth output signals to provide a viable receiver output signal.

BRIEF DESCRIPTION OF DRAWINGS

The present invention may be better understood and its numerous objects, features, and advantages made apparent to those skilled in the art by reference to the accompanying drawings in which.

The use of the same reference symbols in different drawings indicates similar or identical items.

DETAILED DESCRIPTION

In the following description, numerous details are set forth. It will be apparent, however, to one skilled in the art that embodiments of the invention may be practiced without these specific details. In other instances, well-known structures, devices, and techniques have not been shown in detail, in order to avoid obscuring the understanding of the description. The description is thus to be regarded as illustrative instead of limiting.

Reference in the specification to "one embodiment" or "an embodiment" means that a particular feature, structure, or characteristic described in connection with the embodiment is included in at least an embodiment of the invention.

The appearances of the phrase "in one embodiment" in various places in the specification are not necessarily all referring to the same embodiment.

Figure 1:
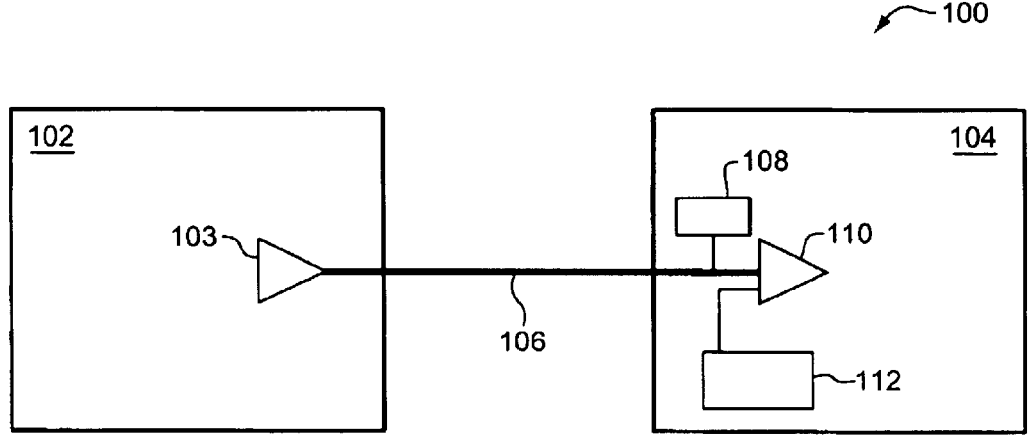
FIG. 1 illustrates an exemplary chip-to-chip communication system 100 in accordance with an embodiment of the present invention.

FIG. 1 illustrates an exemplary chip-to-chip communication system 100 in accordance with an embodiment of the present invention. The communication system 100 includes a driver chip 102 and a receiver chip 104. The driver chip includes a driver circuit 103. In an embodiment, the driver chip 102 and receiver chip 104 are connected together with a single signal trace 106 in a single-ended signaling scheme. As can be seen, the receiver chip 104 may include a termination circuit 108. In one embodiment, it is envisioned that the termination circuit 108 may match the impedance at its input pin to that of the signal trace 106. Such an embodiment can ensure that there are no signal reflections to degrade signal transmissions on, for example, the signal trace 106. In an embodiment, each bit of data can be sent on the signal trace 106 by, for example, charging the signal trace 106 to a "high" voltage for a 1 and a "low" voltage for a 0.

A receiver circuit 110 may be utilized by the receiver chip 104 to capture the data received and compare the voltage associated with the received data at its input pin against an internally generated voltage reference signal. This voltage reference signal may be generated by a reference-voltage-generation circuit 112. In an embodiment, such as that illustrated in FIG. 1, both the receiver circuit 110 and the reference-voltage-generation circuit 112 may be implemented within the receiver chip 104.

Figure 2:
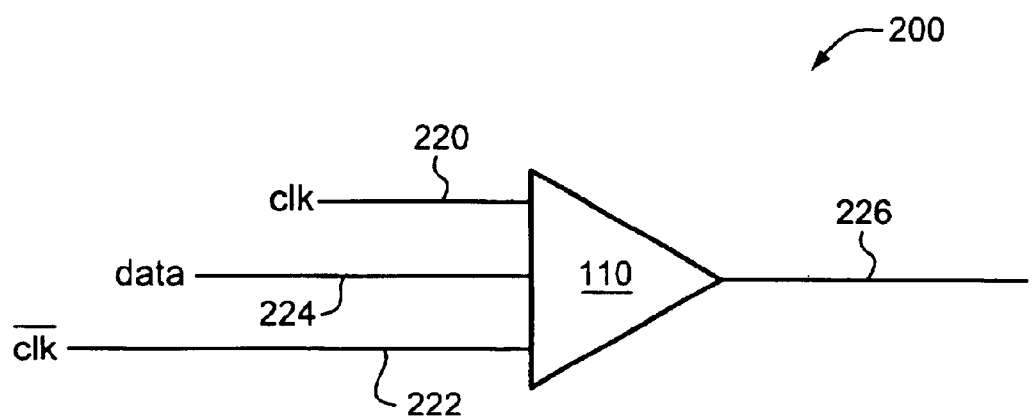
FIG. 2 illustrates an exemplary receiver 200 in accordance with an embodiment of the present invention.

FIG. 2 illustrates an exemplary receiver 200 in accordance with an embodiment of the present invention. A receiver circuit 110 (such as that of FIG. 1) receives a clock signal 220, a clock bar signal 222, and a data signal 224, and provides an output 226. In an embodiment, the receiver circuit 110 may be implemented as a source-synchronous device. Generally, a source-synchronous architecture (also known as clock forwarding) transmits a clock signal with the data from a driver circuit (such as 103 of FIG. 1). As a result, the clock and data arrive at the receiver at substantially the same time. In traditional synchronous clock distribution architecture, however, a common clock source supplies a clock to each recipient. The central clock source enables the data to be clocked in and out of the transceivers, for example. As a result, it is critical that all clocks arrive at each destination at precisely the same time. Minimizing clock skew is of particular importance when using a synchronous distribution scheme. Accordingly, utilizing a source-synchronous technique eliminates issues associated with the clock skew sensitivity of a synchronous design. Also, in an embodiment, the source-synchronous nature of the signaling interface ensures that there is a clock signal which is complementary to the data with respect to its voltage level.

Figure 3:
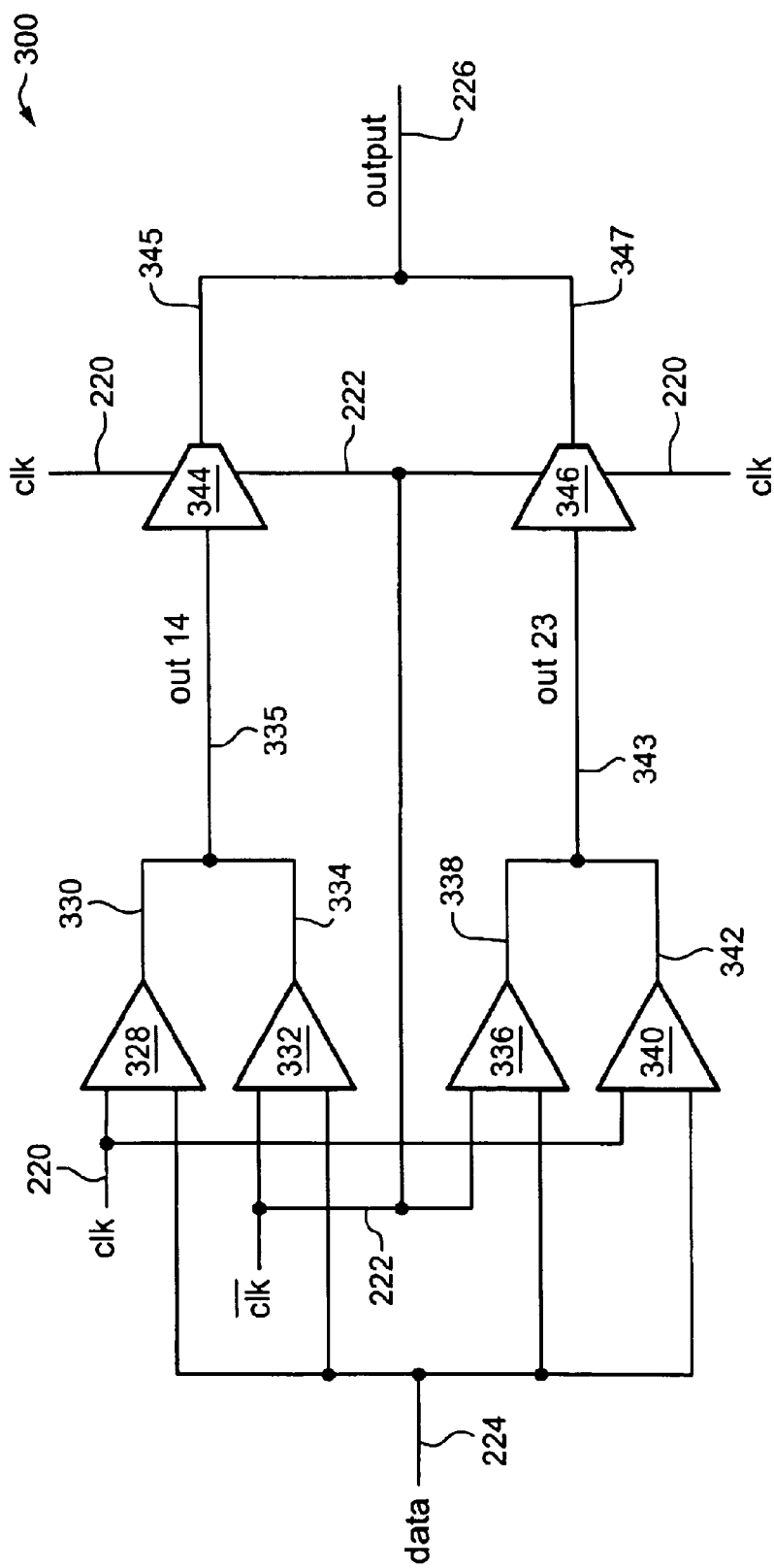
FIG. 3 illustrates an exemplarily exemplary receiver circuit 300 in accordance with an embodiment of the present invention.

FIG. 3 illustrates an exemplary receiver circuit 300 in accordance with an embodiment of the present invention. The receiver circuit 300 includes four differential amplifiers (328, 332, 336, and 340). The differential amplifier 328 receives a clock signal 220 and a data signal 224 and provides an output 330. The differential amplifier 332 receives a clock bar signal 222 and the data signal 224, and provides an output 334. The differential amplifier 336 receives the clock bar signal 222 and the data signal 224, and provides an output 338. The differential amplifier 340 receives the clock signal 220 and the data signal 224, and provides an output 342. The outputs 330 and 334 are then combined and provided as input 335 to a multiplexer 344. The multiplexer 344 also receives the clock 220 and clock bar 222 signals and provides an output 345. Similarly, the outputs 338 and 342 are combined to provide an input 343 to a multiplexer 346. The multiplexer 346 also receives the clock 220 and the clock bar 222 signals and provides an output 347. The outputs 345 and 347 are then combined to provide an output 226 for the receiver circuit 300. Moreover, it is envision that in one embodiment a single multiplexer may be utilized instead of the multiplexers 344 and 346.:

Generally, in implementations utilizing complementary metal oxide semiconductor (CMOS) technology, combining two signals to provide a single signal still provides a full swing output, whereas combining too many outputs may not provide a viable output signal. As such, in an embodiment, the combination of signals 330 and 334, 338 and 342, and 345 and 347 are envisioned to provide a full swing output signal.

Figure 4:
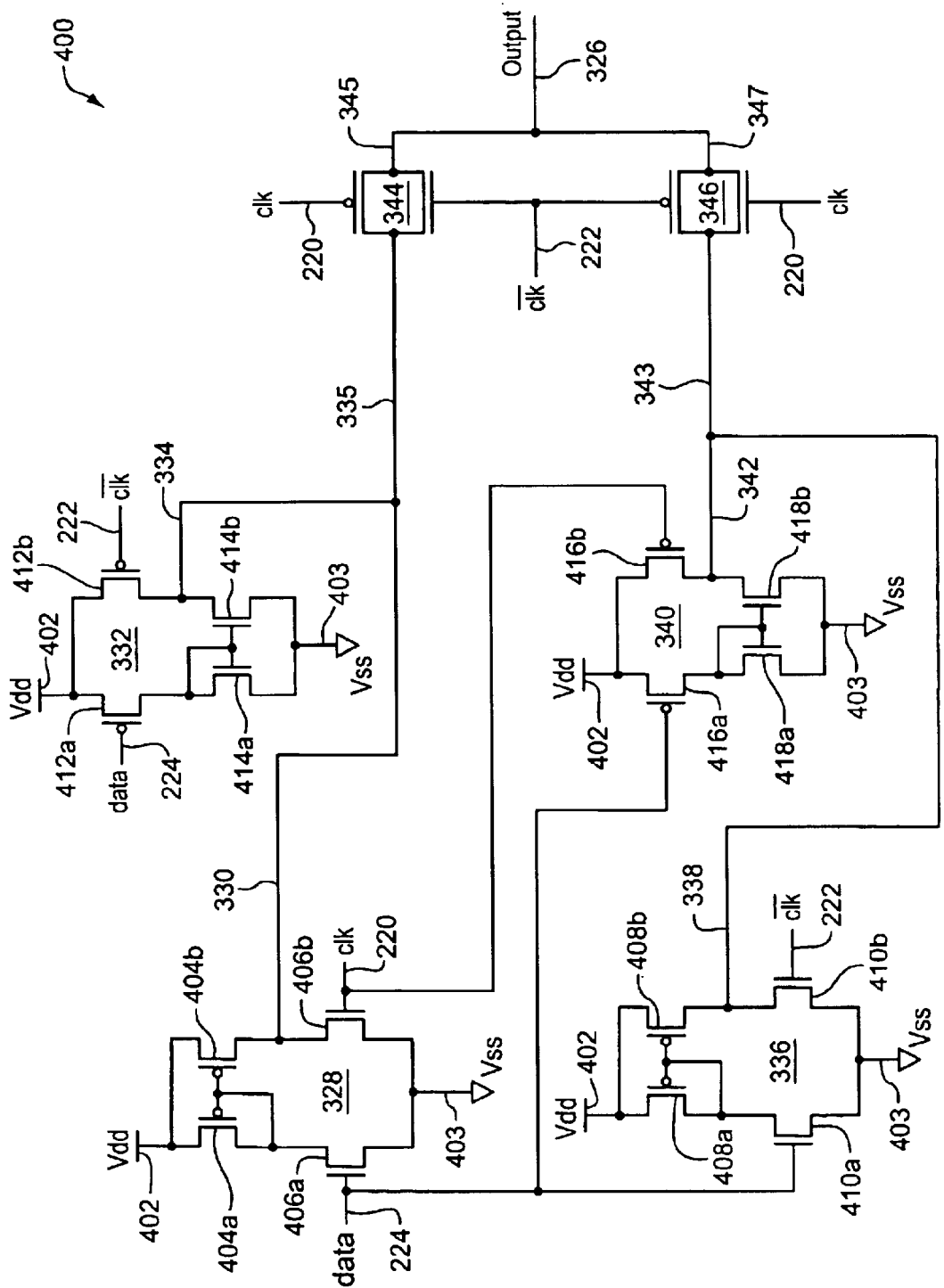
FIG. 4 illustrates an exemplary circuit diagram of a receiver circuit 400 in accordance with an embodiment of the present invention.

FIG. 4 illustrates an exemplary circuit diagram of a receiver circuit 400 in accordance with an embodiment of the present invention. In an embodiment, the receiver circuit 400 illustrates an exemplary transistor level diagram of the receiver circuit 300 of FIG. 3. The receiver circuit 400 includes four differential amplifiers (328, 332, 336, and 340). Each of these differential amplifiers includes a pair of positive-channel metal oxide semiconductor (PMOS) transistors and a pair of negative-channel metal oxide semiconductor (NMOS) transistors. The differential amplifier 328 includes a pair of PMOS transistors 404a and 404b with their gates coupled to the source of the transistor 404a. The drains of the transistors 404a–b are coupled to a positive voltage source 402 (Vdd). The differential amplifier 328 receives the data signal 224 at the gate of its transistor 406a and the clock signal 220 at the gate of its transistor 406b. The sources of the transistors 406a–b are coupled to a potential source 403 which may be implemented as a ground in an embodiment (Vss). The differential amplifier 328 provides the output 330, which is combined with the output of a differential amplifier 332 (334) to provide the output 335.

The differential amplifier 332 also has two PMOS transistors (412a–b). The differential amplifier 332 receives the data signal 224 at the gate of transistor 412a and the clock bar signal 222 at the gate of transistor 412b. As illustrated in FIG. 4, the drain of the transistors 412a–b are coupled to the voltage source 402 (Vdd). The source of transistor 412a is coupled to the drain of the transistor 414a and a source of the transistor 412b is coupled to the source of transistor 414b. The gates of transistors 414a–b are coupled to each other and to the source of transistor 412a. The sources of transistors 414a–b are coupled to the potential source 403 (Vss). The differential amplifier 336 receives its inputs at the gates of transistors 410a and 410b (the data signal 424 and the clock bar signal 222, respectively). The PMOS transistors 408a–b of the differential amplifier 336 are coupled to the voltage source 402 (Vdd) at their drains. The source of the PMOS transistor 408b provides the output 338. The differential amplifier 340 receives it inputs at the PMOS transistors 416a and 416b (the data signal 224 and the clock signal 220, respectively). The sources of NMOS transistors 418a–b are coupled to the potential source 403 (Vss). The output of the differential amplifier 340 (342) is then combined with the output of the differential amplifier 336 (338) to provide the output 343 to the multiplexer 346. The multiplexer 346 is controlled by the clock 220 and clock bar 222 signals and provides an output 347. Similarly, the output of the differential amplifier 332 (334) is combined with the output of the differential amplifier 328 (330) to provide an output 335, which is provided to a multiplexer 344. The multiplexer 344 also receives the clock signal 220 and the clock bar signal 222 and provides its output 345 which is then combined with the output 347 to provide the output 326 of the receiver circuit 400.

Since a reference voltage, such as that provided by the reference-voltage-generation circuit 112, can be noisy in certain designs, in accordance with certain embodiments of the present invention, it is desirable to eliminate issues associated with the reference voltage. This can be done by utilizing clock signals in an embodiment This approach is especially applicable in source-synchronous architecture, as discussed herein. Since both clock and clock bar signals are present, one clock signal is always switching opposite of the data signal. Accordingly, it is desirable to determine which clock signal (e.g., clock or clock bar) should be utilized in a given situation. Table 1 below illustrates the state of the input and outputs associated with the receiver circuit 400 (where the value of X depends on the ratio of the transistors).

TABLE 1

| Clock | Clock Bar | Data | Signal 330 | Signal 334 | Signal 338 | Signal 342 |
|---|---|---|---|---|---|---|
| 0 | 1 | 0 | high Z | 0 | 0 | Vdd/X |
| 1 | 0 | 0 | 0 | Vdd/X | high Z | 0 |
| 0 | 1 | 1 | 1 | high Z | Vdd/X | 1 |
| 1 | 0 | 1 | Vdd/X | 1 | 1 | high Z |

As shown in Table 1 and for example with reference to FIG. 3, for the case where clock is 0 and clock bar is 1, the combined output of differential amplifiers 328 (i.e., 335) may be selected, for example, through the multiplexer 344. And, for the case where clock is 1 and clock bar is 0, the combined output of differential amplifiers 336 and 340 (i.e., 343) may be selected, for example, through the multiplexer 346. This approach ensures that only a high impedance (or high Z) signal is combined with a 0 or 1 which, in turn, ensures a viable output such as that discussed with respect to FIGS. 3 and 4.

The foregoing description has been directed to specific embodiments. It will be apparent to those with ordinary skill in the art that modifications may be made to the described embodiments, with the attainment of all or some of the advantages. For example, the techniques of the present invention may be applied to very large scale integrated (VLSI) logic and/or circuit modules. Therefore, it is the object of the appended claims to cover all such variations and modifications as come within the spirit and scope of the invention.

What is claimed is:

1. A source-synchronous receiver to receive a data signal, the receiver comprising:
    a first amplifier to receive a clock signal and the data signal, the first amplifier providing a first output signal;
    a second amplifier to receive a complementary clock signal and the data signal, the second amplifier providing a second output signal;
    a third amplifier to receive the clock signal and the data signal, the third amplifier providing a third output signal, the second and third output signals being combined to provide a fifth output; and
    a fourth amplifier to receive the complementary clock signal and the data signal, the fourth amplifier providing a fourth output signal, the first and fourth output signals being combined to provide a sixth output signal, wherein the receiver selects one of the fifth and sixth output signals to provide a viable receiver output signal.

2. The receiver of claim 1 wherein each of the first, second, third, and forth amplifiers is a differential amplifier.

3. The receiver of claim 1 wherein each of the first, second, third, and forth amplifiers is coupled to a voltage source and ground.

4. The receiver of claim 1 wherein the selection is performed by a multiplexer.

5. The receiver of claim 4 wherein the multiplexer receives the fifth output, sixth output, clock, and complementary clock signals as inputs.

6. The receiver of claim 1 wherein each of the amplifiers includes at least two PMOS transistors and two NMOS transistors.

7. A method of receiving a data signal in a source-synchronous receiver, the method comprising:
    providing a receiver to receive the data signal, the receiver receiving the data signal, a clock signal, and a complementary clock signal;
    differentially amplifying the data, clock, and complementary clock signals to provide a first output signal and a second output signal;
    determining which one of the first and second output signals is provided through a combination of a high impedance signal and a logic signal; and
    selecting one of the first and second output signals as a receiver output signal based on the determining act.

8. The method of claim 7 wherein the logic signal is selected from a 0 and a 1.

9. The method of claim 7 wherein the selecting is performed by a multiplexer.

10. The method of claim 7 wherein the amplifying is performed by a plurality of amplifiers, each of the plurality of amplifiers being coupled to a voltage source and ground.

11. The method of claim 10 wherein each of the plurality of amplifiers includes at least two PMOS transistors and two NMOS transistors.

12. An apparatus for receiving a data signal, the apparatus comprising:
    means for providing a receiver to receive the data signal, the receiver receiving the data signal, a clock signal, and a complementary clock signal;
    means for differentially amplifying the data, clock, and complementary clock signals to provide a first output signal and a second output signal;
    means for determining which one of the first and second output signals is provided through a combination of a high impedance signal and a logic signal; and
    means for selecting one of the first and second output signals as a receiver output signal based on the determining act.

13. The apparatus of claim 12 wherein the logic signal is selected from a 0 and a 1.

14. The apparatus of claim 12 wherein the means for selecting includes at least a multiplexer.

15. The apparatus of claim 12 wherein the means for differentially amplifying includes a plurality of amplifiers, each of the plurality of amplifiers being coupled to a voltage source and ground.

16. The apparatus of claim 15 wherein each of the plurality of amplifiers includes at least two PMOS transistors and two NMOS transistors.

17. A method of receiving a data signal, the method comprising the steps of:
    providing a receiver to receive the data signal, the receiver receiving the data signal, a clock signal, and a complementary clock signal;

differentially amplifying the data, clock, and complementary clock signals to provide a first output signal and a second output signal; and determining which one of the first and second output signals is provided through a combination of a high impedance signal and a logic signal, wherein one of the first and second output signals is selected as a receiver output signal based on the the determination of which one of the first and second output signals is provided through a combination of a high impedance signal and a logic signal.

18. The method of claim 17 wherein the logic signal is selected from a 0 and 1.

19. The method of claim 17 wherein the the selection of a receiver out put signal is performed by a multiplexer.

20. The method of claim 17 wherein the amplification is performed by a plurality of amplifiers, each of the plurality of amplifiers being coupled to a voltage source and ground.

* * * * *